Shaw & Dawson,
Harness Saddle,
Nº 70,633. Patented Nov. 5, 1867.
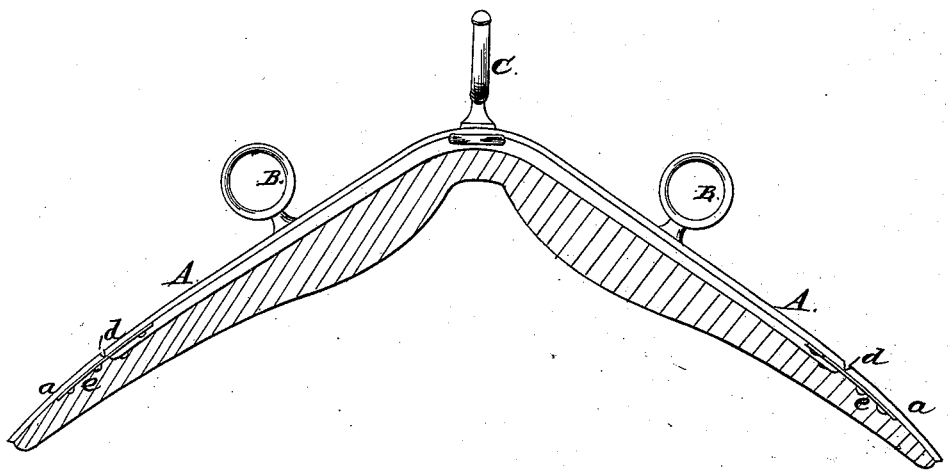
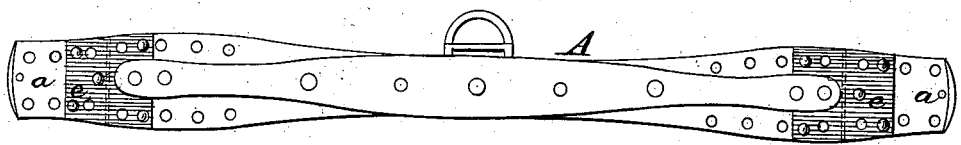
Witnesses:
F. A. Morley.
Joseph Englert.
Inventor:
Palmer Shaw
Edward S. Dawson
per F. A. Mrly
Atty.

United States Patent Office.

PALMER SHAW AND EDWARD S. DAWSON, OF SYRACUSE, NEW YORK.

Letters Patent No. 70,633, dated November 5, 1867.

---

IMPROVED HARNESS-PAD TREE.

---

The Schedule referred to in these Letters Patent and making part of the same.

---

TO ALL WHOM IT MAY CONCERN:

Be it known that we, PALMER SHAW and EDWARD S. DAWSON, of the city of Syracuse, in the county of Onondaga, and State of New York, have invented a new and improved Harness-Pad Tree; and we do hereby declare that the following is a full, clear, and exact description thereof, which will enable those skilled in the art to make and use the same, reference being had to the accompanying drawings, forming part of this specification, in which—

Figure 1 is a front view of our invention, and

Figure 2 is a bottom view of the same.

Similar letters of reference indicate corresponding parts.

This invention relates to a new and useful improvement in pad-trees for harness, whereby a pad constructed in part of unyielding material is made to readily adapt itself to the form of different-sized or conditioned animals; and the invention consists in giving to each leg of the tree a flexible and elastic joint, so that the ends of the pad may drop and take the form of a thin or small animal, or straigthten out and conform to the shape of a fuller or larger animal, as hereinafter explained.

A, in the accompanying drawings, is an ordinary pad-tree; B B are the terrets or guide-loops for the reins; C is the hook for holding the check-reins. The pad is shown by red outline in fig. 1. The lower portions or ends $a\ a$ of the tree are cut off, as shown at $d\ d$, fig. 1, and then reunited to the main portion of the tree, in their former positions, by a thin plate of spring-metal, $e$, riveted over the cut as shown; and thus we obtain a substantial foundation for attaching the pad, and at the same time get the desired degree of elasticity and flexibility, the pad in all cases adjusting itself to the form or outline of the animal.

By this means we are enabled to make a superior article of harness-pad mainly by machinery, and thereby make an important saving in labor.

Having thus described our invention, what we claim as new, and desire to secure by Letters Patent, is—

The elastic plate $e$, covering the joint between the cut-off end $a$, and the pad A, and connecting the two parts substantially as described for the purpose specified.

PALMER SHAW,
EDWARD S. DAWSON.

Witnesses:
CHARLES H. LAMOUREUX,
HENRY L. DERGUID.